United States Patent
Johri et al.

(10) Patent No.: US 9,067,587 B1
(45) Date of Patent: Jun. 30, 2015

(54) TORQUE BASED ENERGY MANAGEMENT IN HYBRID VEHICLE

(71) Applicant: FORD GLOBAL TECHNOLOGIES, LLC, Dearborn, MI (US)

(72) Inventors: Rajit Johri, Ann Arbor, MI (US); Wei Liang, Farmington Hills, MI (US); Christopher Alan Lear, Dearborn, MI (US); Mark Steven Yamazaki, Canton, MI (US); Xiaoyong Wang, Novi, MI (US); Ming Lang Kuang, Canton, MI (US); Ryan Abraham McGee, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 14/157,892

(22) Filed: Jan. 17, 2014

(51) Int. Cl.
*B60W 20/00* (2006.01)
*B60W 10/06* (2006.01)
*B60W 10/08* (2006.01)

(52) U.S. Cl.
CPC ............... *B60W 20/10* (2013.01); *B60W 10/06* (2013.01); *B60W 10/08* (2013.01); *Y10S 903/93* (2013.01)

(58) Field of Classification Search
CPC ..... B60W 20/10; B60W 10/06; B60W 10/08; Y10S 903/93
USPC .......................................................... 701/22
See application file for complete search history.

(56) References Cited

U.S. PATENT DOCUMENTS

| | | | |
|---|---|---|---|
| 6,209,672 B1* | 4/2001 | Severinsky | 180/65.23 |
| 6,907,337 B2* | 6/2005 | Phillips et al. | 701/51 |
| 7,295,902 B2 | 11/2007 | Chen et al. | |
| 7,898,198 B2 | 3/2011 | Murphree | |
| 8,000,866 B2 | 8/2011 | Heap et al. | |
| 8,401,779 B2* | 3/2013 | Troncoso et al. | 701/123 |
| 8,473,133 B2 | 6/2013 | Wang et al. | |
| 8,565,969 B2* | 10/2013 | Bradley et al. | 701/36 |
| 8,655,570 B2* | 2/2014 | Liu et al. | 701/99 |
| 8,668,035 B2* | 3/2014 | Bradley et al. | 180/65.22 |
| 8,708,071 B2* | 4/2014 | Yokoyama et al. | 180/65.265 |
| 8,909,399 B2* | 12/2014 | Kato et al. | 701/22 |
| 2001/0039230 A1* | 11/2001 | Severinsky et al. | 477/3 |
| 2002/0068998 A1* | 6/2002 | Boggs et al. | 701/22 |
| 2003/0004031 A1* | 1/2003 | Philips et al. | 477/5 |
| 2004/0254045 A1* | 12/2004 | McGee et al. | 477/3 |
| 2008/0182698 A1* | 7/2008 | Matsubara et al. | 475/151 |
| 2013/0179014 A1 | 7/2013 | Yamazaki et al. | |
| 2013/0296114 A1* | 11/2013 | Nefcy et al. | 477/5 |

* cited by examiner

*Primary Examiner* — Mary Cheung
*Assistant Examiner* — Frederick Brushaber
(74) *Attorney, Agent, or Firm* — David B. Kelley; Brooks Kushman P.C.

(57) ABSTRACT

A system and method for controlling a powertrain in a hybrid vehicle having an engine and a traction motor include commanding the engine to provide an engine torque corresponding with a desired performance characteristic at a current engine speed. The method additionally includes commanding the motor to provide a motor torque to compensate a difference between an operator torque request and the engine torque.

14 Claims, 4 Drawing Sheets

TORQUE BASED ENERGY MANAGEMENT IN HYBRID VEHICLE

TECHNICAL FIELD

The present disclosure relates to managing power distribution between a traction motor and an engine in a hybrid vehicle.

BACKGROUND

Hybrid electric vehicles include both engines and traction motors. In response to a driver power request, a controller allocates a portion of the driver power request to the engine and a portion of the driver power request to the traction motor.

SUMMARY

A system and method for controlling a powertrain include commanding an engine to provide an engine torque corresponding with a performance characteristic at a current engine speed. The method additionally includes commanding the motor to provide a motor torque to compensate a difference between an operator torque request and the engine torque at a current motor speed. The current motor speed has a fixed speed relationship with the current engine speed and a selectable fixed speed relationship with a current vehicle wheel speed.

In one embodiment of the method, the performance characteristic is a peak engine efficiency. In another embodiment, the engine torque corresponding with a performance characteristic at a current engine speed is obtained from a lookup table. In yet another embodiment, the engine torque obtained from a lookup table may be scaled in response to a battery state of charge being above a first calibratable threshold or below a second calibratable threshold.

A hybrid electric vehicle includes an engine, a traction motor, and at least one controller. The fraction motor has a selectively fixed speed relationship with the engine and a selectable fixed speed relationship with vehicle traction wheels. The controller is configured to command the engine to provide an engine torque corresponding with a performance characteristic at a current engine speed and command the motor to provide a motor torque to satisfy a difference between an operator torque request and the commanded engine torque.

In one embodiment, the controller is further configured to scale the commanded engine torque in response to a battery state of charge being above a first calibratable threshold or below a second calibratable threshold. In another embodiment, the performance characteristic is a peak engine efficiency. In yet another embodiment, the controller is configured to obtain the torque corresponding with a performance characteristic at a current engine speed from a lookup table. In an additional embodiment, the engine has a crankshaft and the traction motor has a rotor, the crankshaft and rotor being configured to rotate at a common speed. In such an embodiment, the common rotational speed corresponds with a vehicle wheel speed multiplied by a selectable fixed gear ratio.

A method for controlling a powertrain in a hybrid electric vehicle having an engine and a traction motor comprises commanding the engine to provide an engine torque corresponding with a desired powertrain performance characteristic based on a current engine speed and a driver torque request. The method additionally includes commanding the motor to provide a motor torque corresponding with the desired powertrain performance characteristic based on a current engine speed and a driver torque request. The current engine speed has a fixed speed relationship with a current motor speed and a selectable fixed speed relationship with a vehicle traction wheel speed.

In one embodiment, commanding the motor to provide a motor torque comprises commanding the motor to provide a motor torque equal to a difference between the driver torque request and the engine torque. In another embodiment, commanding the motor to provide a motor torque comprises commanding the motor to provide a torque corresponding with a peak system efficiency and scaled in response to a battery state of charge. In such an embodiment, commanding the engine to provide an engine torque comprises commanding the engine to provide a torque to compensate a difference between the driver torque request and the commanded motor torque. In one such embodiment, the torque corresponding with a peak system efficiency is obtained from a first lookup table. In such an embodiment, the scaling in response to a battery state of charge includes obtaining a scale factor from a second lookup table based on at least battery state of charge. The scale factor from the second lookup table may additionally be based on current vehicle power.

Embodiments according to the present disclosure provide a number of advantages. For example, the present disclosure provides a system and method for allocating a driver torque request among a traction motor and an engine to increase powertrain efficiency or other desirable powertrain performance characteristics. Furthermore, the present disclosure provides a system and method for allocating a driver torque request among a traction motor and an engine in a vehicle having a common rotational speed for an engine crankshaft and traction motor rotor.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications.

Various combinations and modifications of the features consistent with the teachings of this disclosure, however, could be desired for particular applications or implementations.

Figure 1:
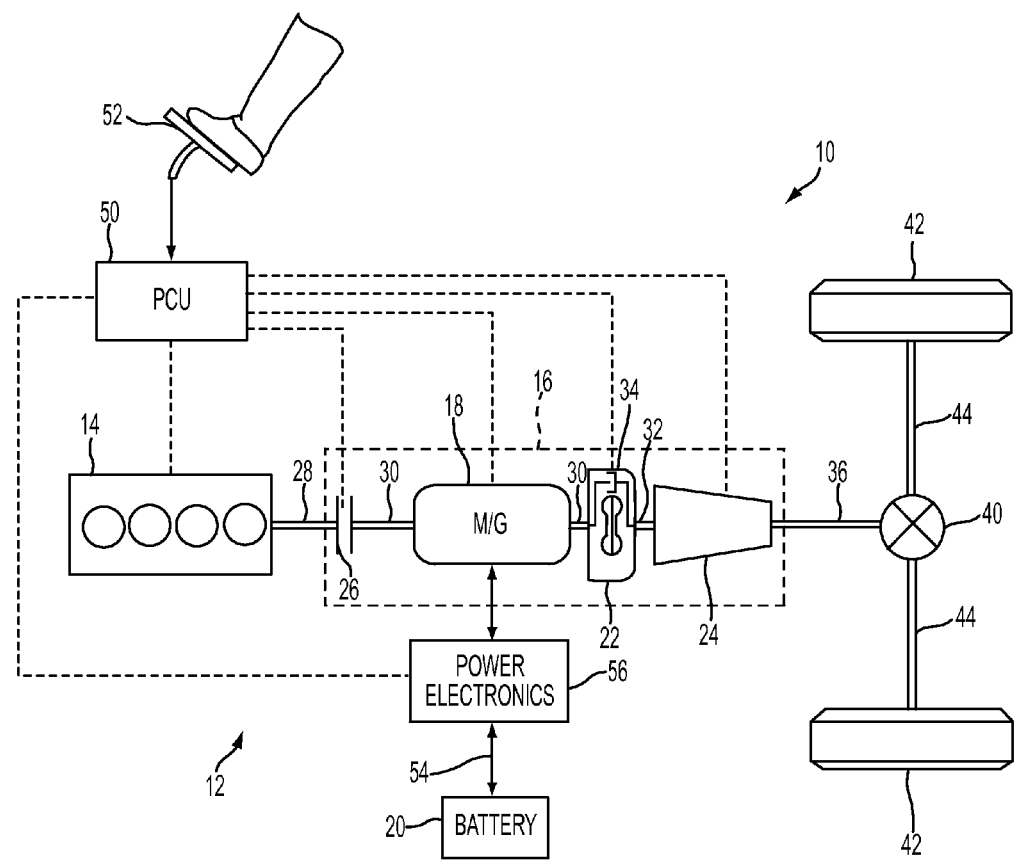
FIG. 1 is a schematic illustration of a hybrid electric vehicle having a modular powertrain configuration.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged. When the disconnect clutch 26 is engaged, a fixed speed relationship exists between the speed of the engine 14 and the speed of the M/G 18.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36. The gearbox 24 may be understood to provide a selectable fixed speed relationship between the speed of M/G 18 and the speed of vehicle traction wheels 42.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

When operating in hybrid mode, controller 50 allocates a portion of driver power requests to engine 14 and a portion to M/G 18. In other hybrid vehicle configurations, motor speed and engine speed may be controlled independently to allocate the driver power request among a motor and engine. In such configurations, a controller varies motor torque, motor speed, engine torque, and engine speed to accommodate the driver power request. In the configuration shown in FIG. 1, when disconnect clutch 26 is engaged for operation in hybrid mode, crankshaft 28 and M/G shaft 30 rotate at a common speed. Consequently, known methods for allocating the driver power request between engine 14 and M/G 18 may not be used.

Figure 2:
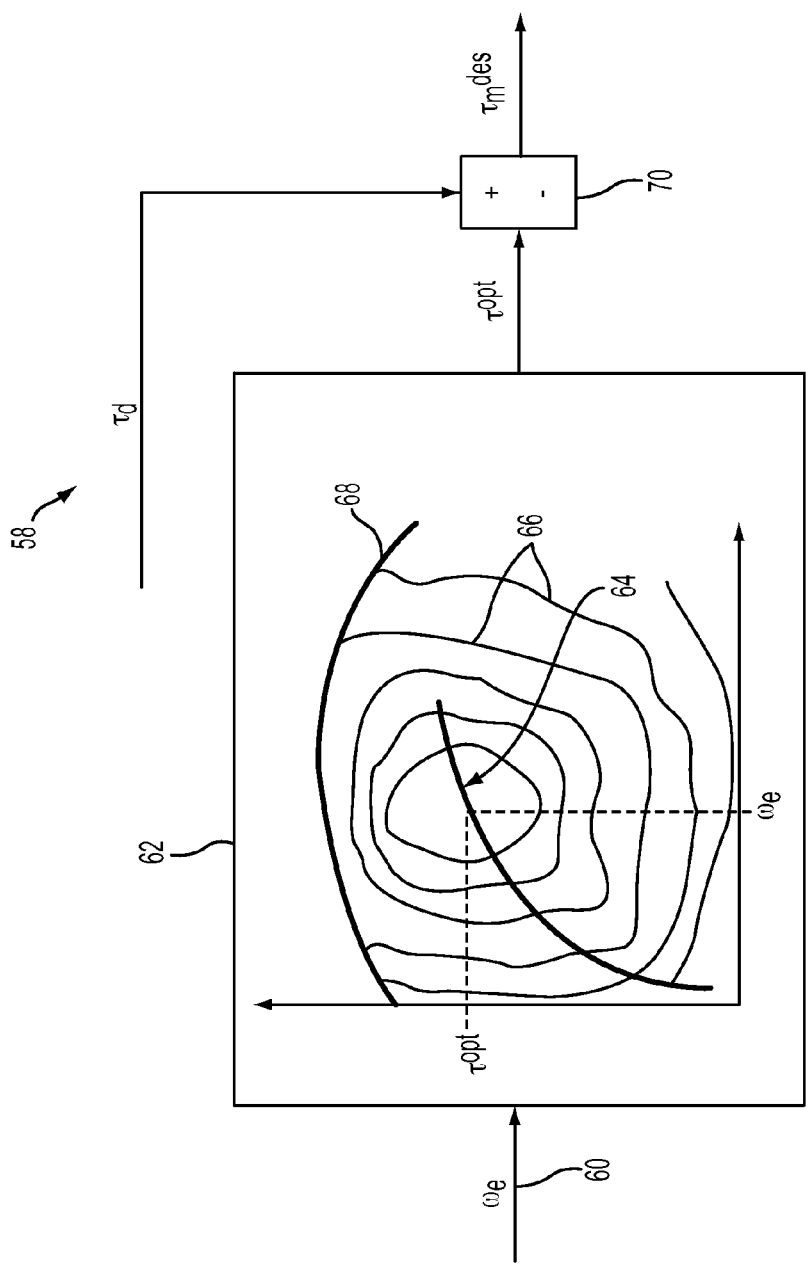
FIG. 2 illustrates control logic for a hybrid vehicle according to the present disclosure.

Referring to FIG. 2, control logic for controlling an engine and a traction motor is illustrated. A driver torque request $\tau_d$ is received as indicated at 58. The driver torque request $\tau_d$ is equivalent to a driver power request divided by a current vehicle speed. A current engine speed $\omega_e$ is also received as indicated at 60. An optimum engine torque $\tau^{opt}$ at current engine speed $\omega_e$ is obtained at operation 62. Operation 62 includes a desired characteristic curve 64 calibrated to provide an optimum engine torque $\tau^{opt}$ for the desired characteristic at a given engine speed $\omega_e$. The desired characteristic may be, for example, peak system efficiency. The desired characteristic could also include reduced emissions, other characteristics, or a combination of characteristics. For explanatory purposes, operation 62 is represented as a chart illustrating operating zones of the engine including a plurality of system efficiency contours 66 bounded by a maximum engine torque curve 68. The desired characteristic curves and contours may be calibrated through vehicle testing, computer simulation, or other methods as appropriate. If the desired characteristic is system efficiency, the efficiency curves and contours will depend on an engine brake specific fuel consumption, motor efficiency map, battery state of charge, powertrain efficiency, and other factors. The operation may be embodied in a lookup table, algorithm, or other methods. The optimum engine torque $\tau^{opt}$ is then provided to operation 70. At operation 70, the optimum engine torque $\tau^{opt}$ is subtracted from the driver torque request $\tau_d$. The resulting difference is the desired motor torque $\tau_m^{des}$. The engine will be commanded to provide a desired engine torque $\tau_e^{des}$ equal to $\tau^{opt}$, and the motor will be commanded to provide a torque equal to $\tau_m^{des}$.

Figure 3:
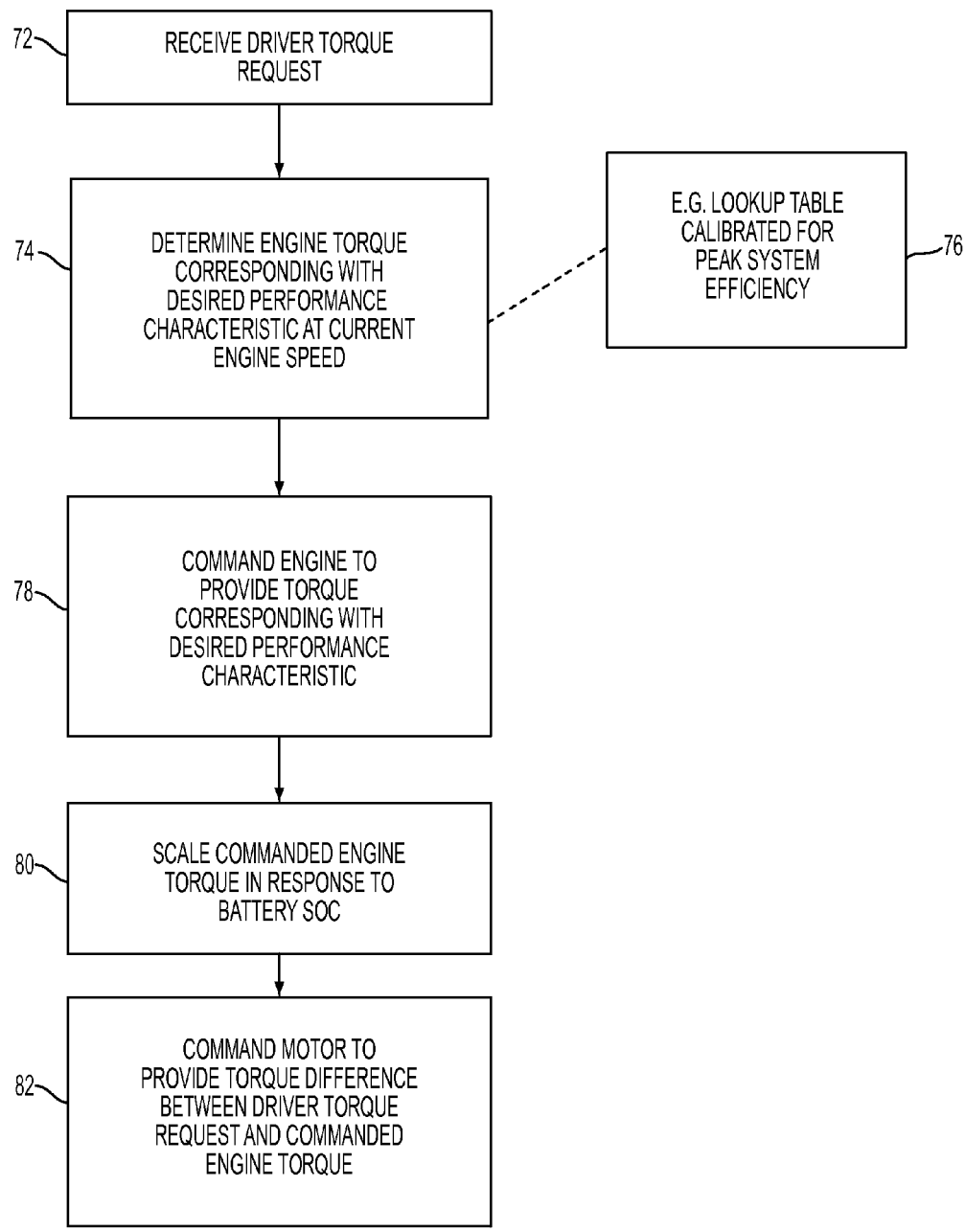
FIG. 3 is a flowchart illustrating a method of controlling a hybrid vehicle.

Referring now to FIG. 3, another embodiment of control logic for controlling an engine and a traction motor is illustrated in flowchart form. A driver torque request is received, as illustrated at block 72. An engine torque corresponding with a desired performance characteristic at a current engine speed is then determined, as illustrated at block 74. As an example, this may include using a lookup table calibrated for peak system efficiency, as illustrated at block 76. The engine is then commanded to provide the engine torque determined in block 74, as illustrated at block 78. The commanded engine torque may additionally be scaled in response to a battery state of charge, as illustrated at block 80. For example, if the battery state of charge is above a first threshold, the commanded engine torque may be reduced, while if the battery state of charge is below a second threshold, the commanded engine torque may be increased. The motor is then commanded to provide a torque to compensate the difference between the driver torque request and the commanded engine torque, as illustrated at block 82.

Figure 4:
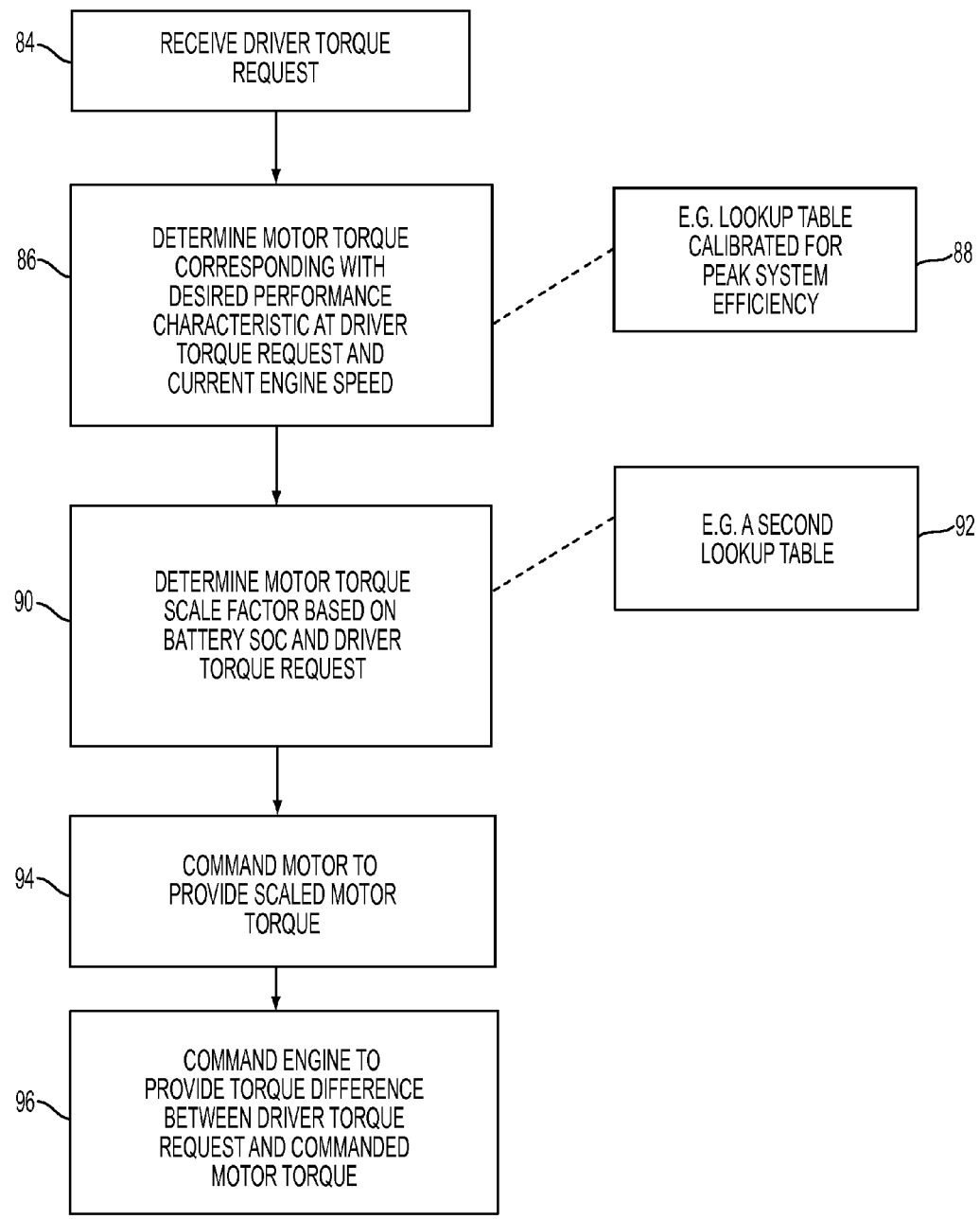
FIG. 4 is a flowchart illustrating another method of controlling a hybrid vehicle.

Referring to FIG. 4, an alternative embodiment of control logic for controlling an engine and a traction motor is illustrated in flowchart form. A driver torque request is received, as illustrated at block 84. A motor torque corresponding with a desired performance characteristic at the current engine speed and the driver torque request is then determined, as illustrated at block 86. As an example, this may include using a three dimensional lookup table calibrated for peak system efficiency, as illustrated at block 88. A motor torque scale factor is then determined based on a traction battery state of charge and current vehicle power, as illustrated at block 90. This may include using a second three-dimensional lookup table, as illustrated at block 92. Such a lookup table may be calibrated to reduce the scale factor as the traction battery state of charge drops or increase the scale factor as a driver torque request increases. The motor torque from block 86 is multiplied by the scale factor from block 90, and the motor is commanded to provide the scaled motor torque, as illustrated at block 94. The engine is then commanded to provide a torque to compensate the difference between the driver torque request and the motor torque commanded in block 94, as illustrated in block 96. Such an embodiment provides various advantages including limiting the motor torque as battery state of charge drops to sustain battery power. Additionally, such an embodiment enables a manufacturer to balance various desirable characteristics including system efficiency and maintaining battery charge by calibrating at least one lookup table.

As can be seen from the various embodiments, the present invention provides a system and method for allocating power between a traction motor and an engine in a hybrid vehicle having a common rotational speed for an engine crankshaft and traction motor rotor. The system and method allocate power to optimize powertrain efficiency or other desirable powertrain performance characteristics.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a powertrain comprising:
    commanding an engine to provide an engine torque corresponding with a performance characteristic at a current engine speed; and
    commanding a traction motor to provide a motor torque to compensate a difference between an operator torque request and the engine torque at a current motor speed having a fixed speed relationship with the current engine speed and a selectable fixed speed relationship with a current vehicle wheel speed.

2. The method of claim 1, wherein the engine torque corresponding with a performance characteristic at a current engine speed is obtained from a lookup table.

3. The method of claim 1, wherein the performance characteristic is a peak efficiency for the powertrain.

4. The method of claim 1, wherein the commanding an engine to provide an engine torque includes scaling the engine torque corresponding with the performance characteristic at the current engine speed in response to a battery state of charge being greater than a first calibratable threshold or less than a second calibratable threshold.

5. A powertrain comprising:
    an engine;
    a fraction motor having a selectively fixed speed relationship with the engine and a selectable fixed speed relationship with vehicle traction wheels; and
    at least one controller configured to command the engine to provide an engine torque corresponding with a performance characteristic at a current engine speed and command the motor to provide a motor torque to satisfy a difference between an operator torque request and the commanded engine torque.

6. The powertrain of claim 5, wherein the controller is further configured to scale the commanded engine torque in response to a battery state of charge being greater than a first calibratable threshold or less than a second calibratable threshold.

7. The powertrain of claim 5, wherein the performance characteristic is a peak system efficiency.

8. The powertrain of claim 5, wherein the controller is further configured to obtain the torque corresponding with a performance characteristic at a current engine speed from a lookup table.

9. The powertrain of claim 5, wherein the engine has a crankshaft and the fraction motor has a rotor and wherein the crankshaft and rotor are configured to rotate at a common speed that corresponds with a vehicle wheel speed multiplied by a selectable fixed gear ratio.

10. A method for controlling a powertrain in a hybrid electric vehicle having an engine and a traction motor, the method comprising:
commanding the engine to provide an engine torque corresponding with a desired powertrain performance characteristic based on a current engine speed and a driver torque request; and
commanding the motor to provide a motor torque corresponding with the desired powertrain performance characteristic based on the current engine speed and the driver torque request, wherein the current engine speed has a fixed speed relationship with a current motor speed and a selectable fixed speed relationship with a vehicle fraction wheel speed.

11. The method of claim 10, wherein the commanding the motor to provide a motor torque comprises commanding the motor to provide a motor torque equal to a difference between the driver torque request and the commanded engine torque.

12. The method of claim 10, wherein the commanding the motor to provide a motor torque comprises commanding the motor to provide a torque corresponding with a peak system efficiency and scaled in response to a battery state of charge and the driver torque request, and wherein commanding the engine to provide an engine torque comprises commanding the engine to provide a torque to compensate a difference between the driver torque request and the commanded motor torque.

13. The method of claim 12, wherein the torque corresponding with a peak system efficiency is obtained from a first lookup table.

14. The method of claim 13, wherein the scaling in response to a battery state of charge and the driver torque request includes obtaining a scale factor from a second lookup table based on at least the battery state of charge and driver torque request.

* * * * *

UNITED STATES PATENT AND TRADEMARK OFFICE
CERTIFICATE OF CORRECTION

| | | |
|---|---|---|
| PATENT NO. | : 9,067,587 B1 | Page 1 of 1 |
| APPLICATION NO. | : 14/157892 | |
| DATED | : June 30, 2015 | |
| INVENTOR(S) | : Rajit Johri et al. | |

It is certified that error appears in the above-identified patent and that said Letters Patent is hereby corrected as shown below:

In the claims

Column 8, Lines 62 - 63, Claim 5:

After "an engine"
Delete "a fraction" and
insert -- a traction --.

Signed and Sealed this
First Day of December, 2015

Michelle K. Lee
*Director of the United States Patent and Trademark Office*